United States Patent
Eberl et al.

(10) Patent No.: US 10,996,201 B2
(45) Date of Patent: May 4, 2021

(54) PHOTOACOUSTIC MEASUREMENT SYSTEMS AND METHODS USING THE PHOTOACOUSTIC EFFECT TO MEASURE EMISSION INTENSITIES, GAS CONCENTRATIONS, AND DISTANCES

(71) Applicant: Infineon Technologies AG, Neubiberg (DE)

(72) Inventors: Matthias Eberl, Taufkirchen (DE); Franz Jost, Stuttgart (DE)

(73) Assignee: Infineon Technologies AG

( * ) Notice: Subject to any disclaimer, the term of this patent is extended or adjusted under 35 U.S.C. 154(b) by 252 days.

(21) Appl. No.: 16/227,950

(22) Filed: Dec. 20, 2018

(65) Prior Publication Data

US 2019/0195834 A1  Jun. 27, 2019

(30) Foreign Application Priority Data

Dec. 21, 2017 (DE) .......................... 102017130988.8

(51) Int. Cl.
| | |
|---|---|
| G01N 29/24 | (2006.01) |
| G01J 1/16 | (2006.01) |
| G01J 1/42 | (2006.01) |
| G01N 21/17 | (2006.01) |

(52) U.S. Cl.
CPC ........ *G01N 29/2425* (2013.01); *G01J 1/1626* (2013.01); *G01J 1/42* (2013.01); *G01N 21/1702* (2013.01); *G01J 2001/4242* (2013.01); *G01N 2021/1704* (2013.01); *G01N 2291/021* (2013.01)

(58) Field of Classification Search
None
See application file for complete search history.

(56) References Cited

U.S. PATENT DOCUMENTS

| | | | | |
|---|---|---|---|---|
| 4,105,919 A | * | 8/1978 | Bridges ............... | G01N 21/1702 250/341.3 |
| 4,817,413 A | * | 4/1989 | Asano ................ | G01N 21/1702 73/24.02 |

(Continued)

FOREIGN PATENT DOCUMENTS

| | | |
|---|---|---|
| CN | 104568757 A | 4/2015 |
| CN | 105259116 A | 1/2016 |

(Continued)

*Primary Examiner* — Lisa M Caputo
*Assistant Examiner* — Nigel H Plumb
(74) *Attorney, Agent, or Firm* — Design IP

(57) ABSTRACT

An apparatus containing an optical emitter configured to emit optical radiation is provided. Further, the apparatus includes a first hermetically sealed measurement cell filled with a first gas. The first gas is configured to absorb the optical radiation at least partially at one or more predetermined wavelengths. Additionally, the apparatus includes a first microphone arranged in the measurement cell and configured to generate a first microphone signal on a basis of a photoacoustic excitation of the first gas by the optical radiation. The apparatus moreover includes an evaluation circuit configured to take the first microphone signal as a basis for generating a first measurement signal indicating an emission intensity of the optical emitter at the one or more predetermined wavelengths.

21 Claims, 10 Drawing Sheets

(56) References Cited

U.S. PATENT DOCUMENTS

| | | | | |
|---|---|---|---|---|
| 6,108,096 | A * | 8/2000 | Ushio | G01N 21/1702 356/432 |
| 9,513,261 | B2 * | 12/2016 | Dehe | G01N 29/2425 |
| 10,241,088 | B2 | 3/2019 | Theuss et al. | |
| 2010/0007016 | A1 * | 1/2010 | Oppermann | H01L 21/486 257/737 |
| 2012/0099103 | A1 * | 4/2012 | Hahn | G01N 21/718 356/316 |
| 2012/0103065 | A1 * | 5/2012 | Muehleisen | G01J 3/18 73/24.02 |
| 2015/0102372 | A1 * | 4/2015 | Dehe | H01L 33/44 257/98 |
| 2015/0204822 | A1 * | 7/2015 | Horan | G01N 29/04 73/643 |
| 2016/0231239 | A1 * | 8/2016 | Kotidis | H01S 5/0622 |
| 2017/0067859 | A1 * | 3/2017 | Kolb | G01N 29/2418 |
| 2017/0140905 | A1 * | 5/2017 | Mihaylov | H01J 37/32917 |
| 2018/0120266 | A1 * | 5/2018 | Tumpold | G01N 29/2418 |
| 2018/0188081 | A1 * | 7/2018 | Altendorf | G01N 21/272 |
| 2020/0103376 | A1 | 4/2020 | Kolb et al. | |

FOREIGN PATENT DOCUMENTS

| | | |
|---|---|---|
| CN | 106066305 A | 11/2016 |
| CN | 106501181 A | 3/2017 |
| CN | 107024432 A | 8/2017 |
| DE | 3345077 A1 | 7/1984 |
| DE | 102014114672 A1 | 4/2015 |
| EP | 0924508 A2 | 6/1999 |
| WO | 9944040 A1 | 9/1999 |
| WO | 2004008112 A1 | 1/2004 |

* cited by examiner

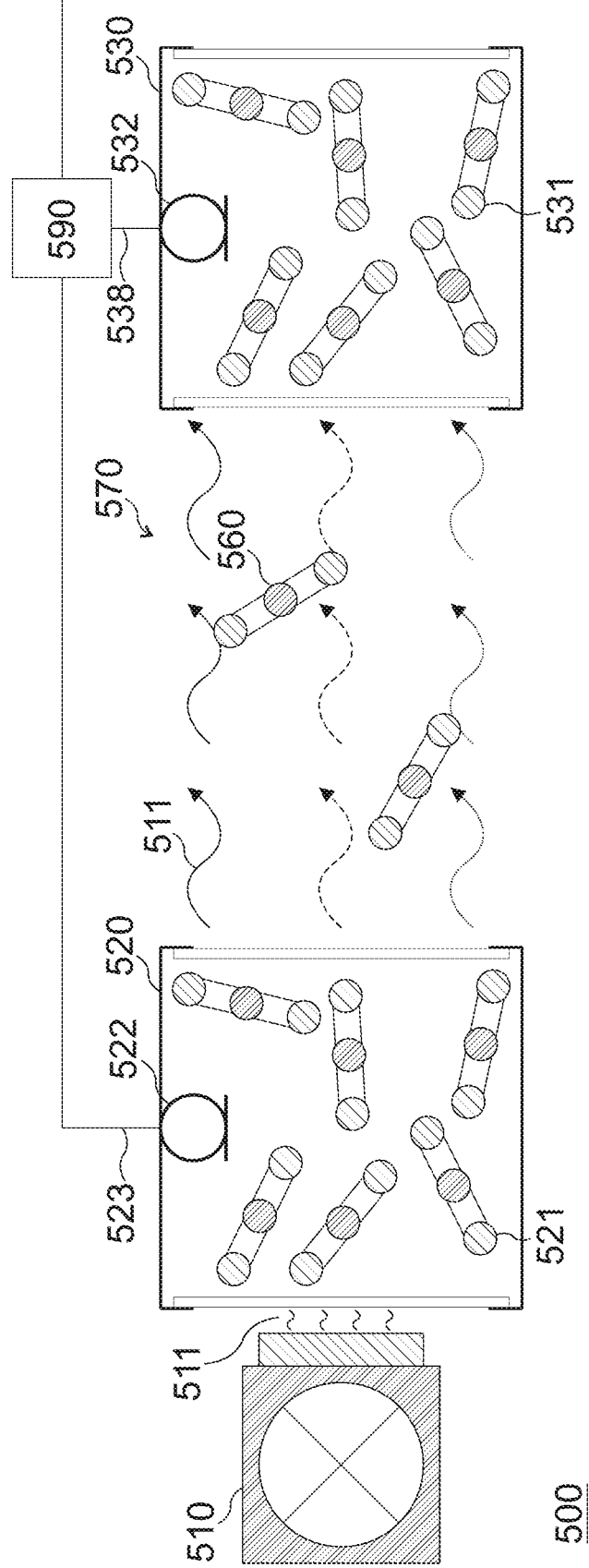

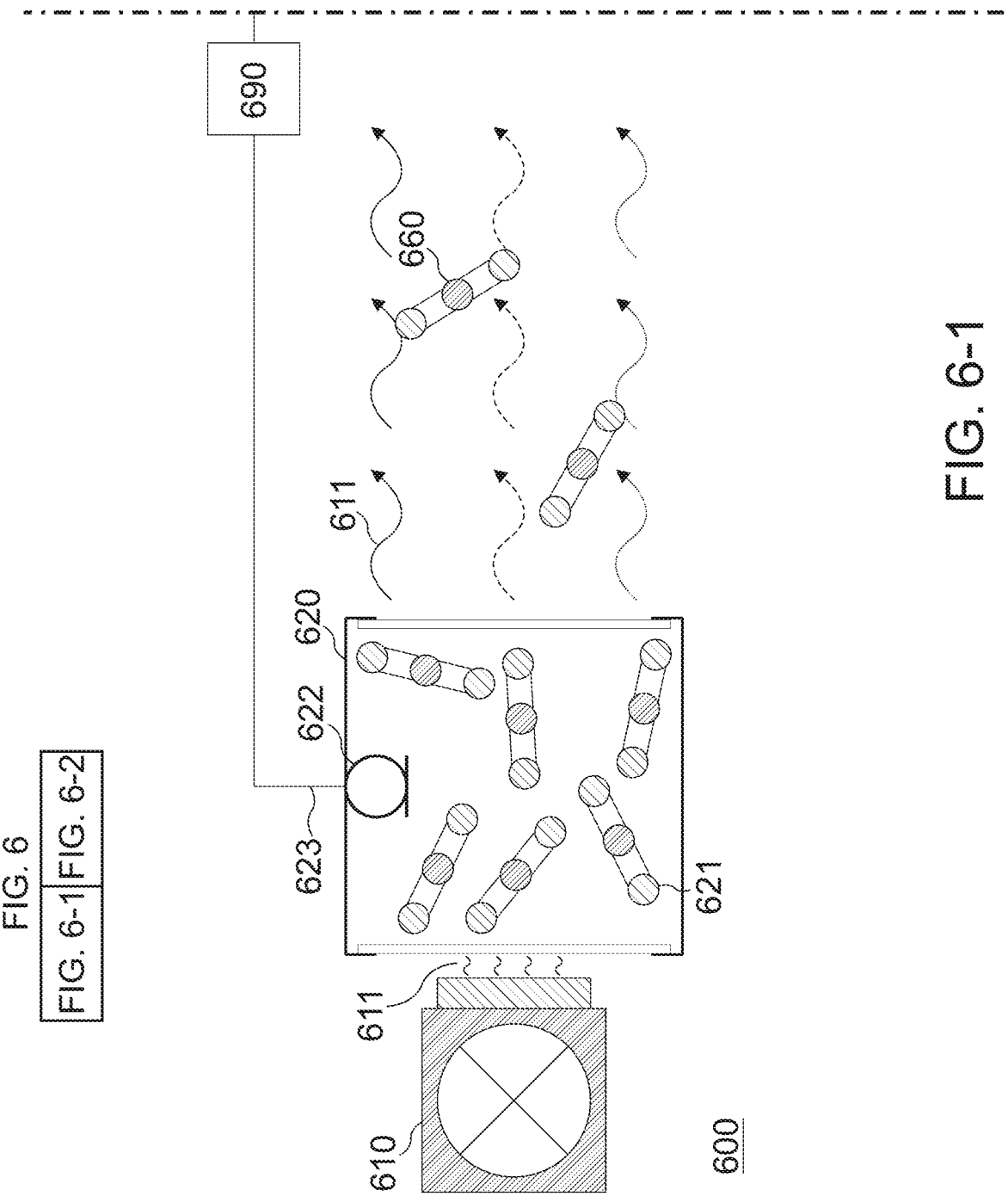

PHOTOACOUSTIC MEASUREMENT SYSTEMS AND METHODS USING THE PHOTOACOUSTIC EFFECT TO MEASURE EMISSION INTENSITIES, GAS CONCENTRATIONS, AND DISTANCES

FIELD

Exemplary embodiments relate to apparatuses and methods that use the photoacoustic effect.

BACKGROUND

Photoacoustic measurement systems use a modulated infrared wideband source for emitting infrared radiation. The radiation is routed through a measuring section and partially absorbed by a gas contained therein in a determined wavelength range (e.g. 4.3 µm for $CO_2$). The remaining radiation subsequently enters a reference cell having a microphone through an optical window, said reference cell being hermetically sealed and completely filled with a reference gas (e.g. $CO_2$). The remaining energy of the radiation is absorbed by the reference gas in the reference cell, as a result of which said reference gas heats and expands. The pressure difference arising in the reference cell as a result can be measured by the microphone as a sound wave. In order to be able to make statements about characteristics of the gas contained in the measurement cell, the radiation power of the radiation source in the wavelength range absorbed by the gas needs to be known.

In order to determine the output power of the radiation source, customary systems use the automatic baseline correction (ABC) method and reference the measurement signal downward essentially "on conjecture". Other systems use a reference channel in an optical window, i.e. use a wavelength range in which no other relevant gas is absorbed, which means that the emitter power can be measured independently in this range. Further systems use differential photoacoustic spectroscopy, which involves a differential pressure being measured by means of two different beam paths.

All the aforementioned approaches entail problems however. The ABC method is only reliable if the measurement system is regularly exposed to a known gas concentration. A lengthy operation under differing conditions leads to incorrect measurement results. The use of the optical window, i.e. a reference measurement in a spectral range other than the spectral range necessary for the measurement, can lead to an erroneous measurement if the spectral emissivity of the radiation source is not constant. By way of example, manufacturing-related tolerances in the radiation source can render sophisticated measurement of the radiation source necessary. The differential system uses two separate sensors, resulting in different optical paths, which means that changes in the individual paths (e.g. temperature, reflection, length, etc.) may not be noticed.

SUMMARY

There is therefore a need to provide improved techniques for using the photoacoustic effect. In particular, there is a need to determine the radiation power of a radiation source in a wavelength range of interest.

The need can be covered by the subject matter of the patent claims, which allows, inter alia, determination of the emission intensity of an optical emitter by using a measurement cell filled with a gas.

A first exemplary embodiment relates to an apparatus comprising an optical emitter configured to emit optical radiation. Further, the apparatus comprises a first hermetically sealed measurement cell filled with the first gas. The first gas is configured to absorb the optical radiation at least partially at one or more predetermined wavelengths. Additionally, the apparatus comprises a first microphone arranged in the measurement cell and configured to generate a first microphone signal on the basis of a photoacoustic excitation of the first gas by the optical radiation. The apparatus also comprises an evaluation circuit configured to take the first microphone signal as a basis for generating a first measurement signal indicating an emission intensity of the optical emitter at the one or more predetermined wavelengths.

A further exemplary embodiment relates to an apparatus comprising a first optical emitter configured to emit first optical radiation at a first time and a second optical emitter configured to emit second optical radiation at a second time. Further, the apparatus comprises at least two hermetically sealed measurement cells arranged in series between the first and second optical emitters and each filled with a gas configured to absorb the first optical radiation and the second optical radiation at one or more predetermined wavelengths in each case. Each of the at least two measurement cells has a respective microphone arranged in it that is configured to generate a respective microphone signal on the basis of a photoacoustic excitation of the gas in the respective measurement cell by the first optical radiation or the second optical radiation. Additionally, the apparatus comprises at least one area, filled with a gas to be examined, that is arranged between the at least two measurement cells. The apparatus also comprises an evaluation circuit configured to determine an emission intensity of the first optical emitter at the one or more predetermined wavelengths based on a change in a first of the microphone signals after the first time and to determine an emission intensity of the second optical emitter at the one or more predetermined wavelengths based on a change in a second of the microphone signals after the second time.

Further, one exemplary embodiment relates to a method comprising emitting optical radiation by means of an optical emitter. The method also comprises absorbing the optical radiation at one or more predetermined wavelengths by means of a first gas in a first hermetically sealed measurement cell. Additionally, the method comprises generating a first microphone signal on the basis of a photoacoustic excitation of the first gas by the optical radiation by means of a first microphone arranged in the first measurement cell. The method further comprises generating a first measurement signal, indicating an emission intensity of the optical emitter at the one or more predetermined wavelengths, based on the first microphone signal.

Also, one exemplary embodiment relates to a method comprising emitting first optical radiation at a first time by means of a first optical emitter and emitting second optical radiation at a second time by means of a second optical emitter. Additionally, the method comprises absorbing the first optical radiation and the second optical radiation at one or more predetermined wavelengths by means of a gas in at least two hermetically sealed measurement cells. The at least two measurement cells are arranged in series between the first and second optical emitters, at least one area filled with a gas to be examined being arranged between the at least two measurement cells. The method further comprises generating a respective microphone signal on the basis of a photoacoustic excitation of the gas in each of the at least two measurement cells by the first optical radiation or the second optical radiation by means of a respective microphone arranged in the measurement cell. Also, the method comprises determining an emission intensity of the first optical emitter at the one or more predetermined wavelengths based on a change in a first of the microphone signals after the first time. Similarly, the method comprises determining an emission intensity of the second optical emitter at the one or more predetermined wavelengths based on a change in a second of the microphone signals after the second time.

BRIEF DESCRIPTION OF THE DRAWINGS

Some examples of apparatuses and/or methods are explained in more detail below merely by way of example with reference to the accompanying figures, in which:

FIGS. 4-1 and 4-2 show a fourth exemplary embodiment of an apparatus using the photoacoustic effect;

FIGS. 5-1 and 5-2 show a fifth exemplary embodiment of an apparatus using the photoacoustic effect;

FIGS. 6-1 and 6-2 show a sixth exemplary embodiment of an apparatus using the photoacoustic effect;

DETAILED DESCRIPTION

Various examples are now described in more detail with reference to the accompanying figures, which depict a few examples. The thicknesses of lines, layers and/or areas in the figures may be exaggerated for clarity.

While further examples are suitable for various modifications and alternative forms, a few particular examples thereof are accordingly shown in the figures and are described in detail below. However, this detailed description does not restrict further examples to the particular forms described. Further examples can cover all modifications, counterparts and alternatives that fall within the scope of the disclosure. Identical reference signs refer throughout the description of the figures to identical or similar elements that can be implemented identically or in modified form in comparison with one another, while they provide the same or a similar function.

It goes without saying that if one element is referred to as "connected" or "coupled" to another element, the elements can be connected or coupled directly or via one or more intermediate elements. If two elements A and B are combined using an "or", this should be understood such that all possible combinations are disclosed, i.e. only A, only B, and A and B. An alternative wording for the same combinations is "at least one of A and B". The same applies to combinations of more than 2 elements.

The terminology used here to describe specific examples is not intended to have a limiting effect for further examples. When a singular form, e.g. "a, an" and "the" is used, and the use of only a single element is defined neither explicitly nor implicitly as mandatory, further examples can also use plural elements in order to implement the same function. If a function is described below as implemented using a plurality of elements, further examples can implement the same function using a single element or a single processing entity. Furthermore, it goes without saying that the terms "comprises", "comprising", "has" and/or "having" in their usage specify the presence of the indicated features, integers, steps, operations, processes, elements, components and/or a group thereof, but do not exclude the presence or addition of one or more other features, integers, steps, operations, processes, elements, components and/or a group thereof.

Unless defined otherwise, all terms (including technical and scientific terms) are used here in their customary meaning in the field with which examples are associated.

Figure 1A:
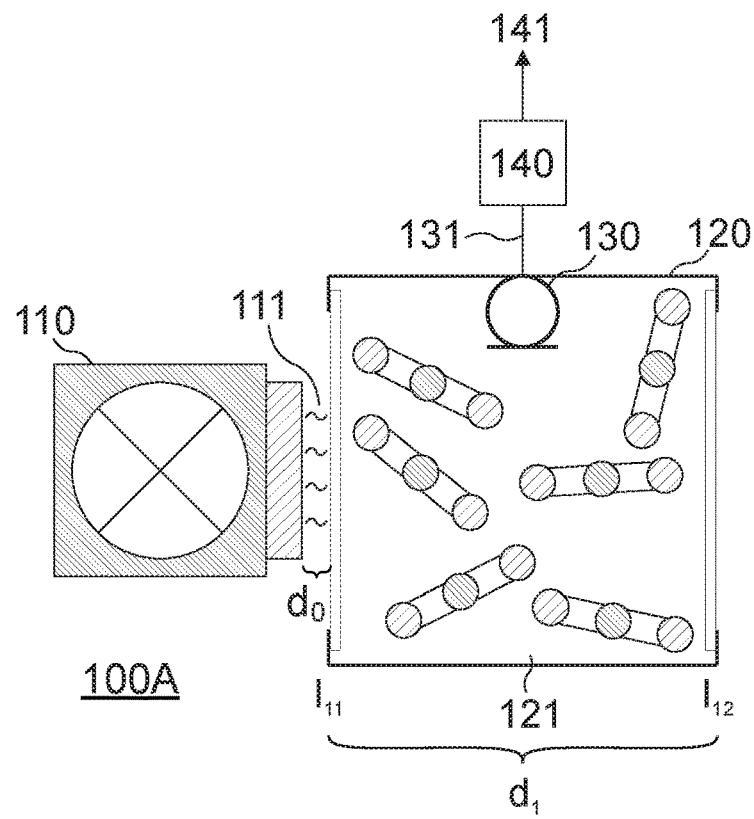
FIG. 1A shows a first exemplary embodiment of an apparatus using the photoacoustic effect and FIG. 1B shows a variation to the embodiment of FIG. 1A.
Figure 1B:
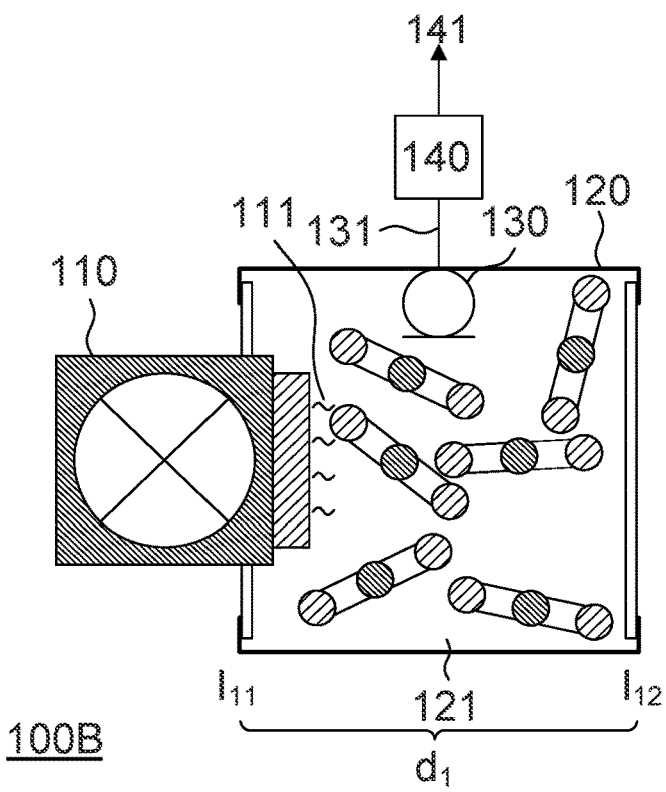

FIG. 1A shows an apparatus 100A using the photoacoustic effect. FIG. 1B shows an apparatus 100B using the photoacoustic effect where an optical emitter 110 is arranged inside a first hermetically sealed measurement cell 120. Aside from this difference, apparatuses 110A and 100B are substantially similar. Apparatus 100A comprises an optical emitter 110 configured to emit optical radiation 111. The optical emitter 110 can produce the optical radiation 111 having radiation components at a single or multiple wavelength(s). The optical emitter 110 may thus be a selective emitter or a wideband emitter (e.g. black-body emitter or thermal emitter). By way of example, the optical emitter 110 may be embodied as a semiconductor component in the form of a light-emitting diode (LED). Alternatively, the optical emitter 110 may also be embodied as a laser emitter or any other source of radiation in the optical domain. The optical radiation can comprise both infrared radiation (wavelength 780 nm to 1 mm) and radiation in the visible range (wavelength 380 nm to 780 nm). The optical radiation may optionally also be chopped (e.g. electrically, mechanically or optically), i.e. the optical radiation is a periodically modulated radiation. The optical emitter 110 can emit the optical radiation 111 along a single spatial direction, as indicated in FIG. 1A. Alternatively, the optical emitter 110 can also emit the optical radiation 111 along multiple spatial directions (e.g. in opposite spatial directions, in spatial directions at right angles to one another or spherically in all spatial directions).

Further, apparatus 100A comprises a first hermetically sealed measurement cell 120 filled with a first gas 121. The first measurement cell 120 is therefore essentially gas-tight, which means that essentially no exchange of gas can take place between the volume enclosed by the first measurement cell 120 (i.e. the first gas 121) and the gaseous atmosphere surrounding the first measurement cell 120. In this case, however, it is self-evident that standard process variations or tolerances mean that a perfect seal for the measurement cell 120 is not always possible. Accordingly, the term "hermetically sealed" within the context of the present disclosure also includes measurement cells that allow a certain (very low) leakage or not directly measurable leakage into the volume enclosed by the measurement cell or from said volume.

The first gas 121 is configured to absorb the optical radiation 111 at least partially at one or more predetermined wavelengths. In other words: radiation components of the optical radiation 111 at the one or more predetermined wavelengths interact with the first gas 121 and in so doing deliver at least some of their energy to the first gas 121. By way of example, the first gas may be $CO_2$, CO, $H_2O$, $CH_4$, $O_3$, $NH_4$, $NO_x$ or $N_2O$. However, it is also possible to use any other gas that absorbs light quanta at the one or more predetermined wavelengths. The multiple wavelengths may be e.g. successive wavelengths, which means that the first gas 121 absorbs the optical radiation 111 over a predetermined spectral range. Alternatively, the multiple wavelengths may also be at intervals from one another in the spectrum. By way of example, the first gas (e.g. $CO_2$) may be configured to absorb infrared radiation at least partially.

Additionally, apparatus 100A comprises a first microphone 130 arranged in the first measurement cell 120. The first microphone 130 is configured to generate a first microphone signal 131 on the basis of a photoacoustic excitation of the first gas 121 by the optical radiation 111. The first microphone 130 may be e.g. a Micro Electro Mechanical System (MEMS) microphone that can be read e.g. electronically or optically in order to generate the first microphone signal 131. The optical radiation 111 entering the first measurement cell is absorbed by the first gas 121 at least partially at the one or more predetermined wavelengths, so that the first gas 121 heats and expands on account of the intake of energy. The heating of the first gas 121 in the constant volume enclosed by the first measurement cell 120 leads to a pressure change inside the first measurement cell 120, which is measured as a sound wave by the first microphone 130. In the first measurement cell 120, at least some of the optical energy of the optical radiation 111 is therefore converted into acoustic energy and in this way the first gas 121 is excited photoacoustically. Since the microphone signal 131 represents the pressure change inside the first measurement cell 120, it indicates the amount of energy delivered to the first gas 121 by the optical radiation 111.

Apparatus 100A also comprises an evaluation circuit 140 coupled to the first microphone 130 and configured to take the first microphone signal 131 as a basis for generating a first measurement signal 141 indicating an emission intensity of the optical emitter 110 at the one or more predetermined wavelengths (e.g. in the case of a predetermined wavelength band). The emission intensity describes the optical output power (emission power) of the optical emitter 110 at the one or more predetermined wavelengths. The first measurement signal 141 may be e.g. the microphone signal 131 itself or a signal comprising information about a (physical) variable describing the emission intensity of the optical emitter 110 at the one or more predetermined wavelengths.

The emission intensity of the optical emitter 110 can be calculated from the first microphone signal 131 e.g. according to the following example calculation:

let $I_{11}$ be the emission intensity of the optical emitter 110 at the one or more predetermined wavelengths, i.e. the initial intensity of the optical radiation 111 at the one or more predetermined wavelengths.

let $I_{12}$ be the remaining intensity of the optical radiation 111 at the one or more predetermined wavelengths after passage through the first measurement cell 120. The remaining intensity $I_{12}$ is dependent on the known absorption coefficient $\varepsilon_1$ of the first gas 121 and the known length $d_1$ of the first measurement cell 120, i.e. the path length of the optical radiation 111 through the first gas 121:

$$I_{12} = I_{11} \cdot e^{-\varepsilon_1 d_1} \quad (1)$$

As already explained above, the first microphone signal 131 describes the amount of energy delivered to the first gas 121 by the optical radiation 111. The first microphone signal is therefore used to measure the difference $\Delta I_1$ in the intensities $I_{11}$ and $I_{12}$ of the optical radiation:

$$\Delta I_1 = I_{11} - I_{12} = I_{11} - I_{11} \cdot e^{-\varepsilon_1 d_1} \quad (2)$$

$\Delta I_1$ can therefore represent a measurement signal indicating an emission intensity of the optical emitter 110 at the one or more predetermined wavelengths. It is now possible to determine the applicable emission intensity $I_{11}$ of the optical emitter 110 therefrom by means of transformation:

$$I_{11} = \frac{\Delta I_1}{1 - e^{-\varepsilon_1 d_1}} \quad (3)$$

For the calculation above, it has been assumed that the effective interval $d_0$ and hence the absorption of the optical radiation 111 in the space between the optical emitter 110 and the first measurement cell 120 are negligible, i.e. zero. FIG. 1A depicts the optical emitter 110 and the first measurement cell 120 spaced apart from one another. The above assumption of an effective interval $d_0=0$ between the optical emitter 110 and the first measurement cell 120 can be realized in this configuration e.g. by virtue of a vacuum or a gaseous atmosphere that does not absorb the optical radiation 111 at the one or more predetermined wavelengths prevailing in a space between the optical emitter 110 and the measurement cell 120. By way of example, the gaseous atmosphere can consist of more than 70, 80, 90 or 95 percent by volume nitrogen, a noble gas or a chemically inert gas. In alternative embodiments, like the one shown in FIG. 1B, the optical emitter 110 may e.g. also be arranged in the first measurement cell 120 itself. Similarly, by way of example, it is also possible for an inlet window of the measurement cell 120 for the optical radiation 111 to be arranged (directly) on the optical emitter 110. By way of example, the optical emitter 120 may be adhesively bonded to the inlet window of the measurement cell 120.

Apparatus 100A therefore comprises a measurement cell that has been introduced into the optical path directly downstream of the optical emitter. As such, the optical output power of the emitter at the one or more predetermined wavelengths can be directly measured (e.g. at a wavelength of 4.3 μm if the first gas is $CO_2$). Apparatus 100A therefore allows a direct measurement of the radiation power of the optical emitter 110.

With the aid of further measurement cells, the apparatus 100A can also be used to examine or characterize a gas of interest. This is shown schematically in FIG. 2, which shows a further apparatus 200. Like apparatus 100A, the apparatus 200 comprises the optical emitter 110 and the first measurement cell 120. To avoid unnecessary repetitions, these components are thus not described again below. The description that follows concentrates on the additional or further components of the apparatus 200.

Apparatus 200 comprises a second hermetically sealed measurement cell 220 filled with a second gas 221. The second gas 221 in the second measurement cell 220 is configured to absorb the optical radiation 111 at the one or more predetermined wavelengths. In other words: radiation components of the optical radiation 111 at the one or more predetermined wavelengths interact with the second gas 221 and in so doing deliver at least some of their energy to the second gas 221. By way of example, the second gas may be configured to absorb infrared radiation at least partially. The first gas 121 and the second gas 221 can have the same chemical composition.

Additionally, the apparatus 200 comprises a second microphone 230 arranged in the second measurement cell 220. The second microphone is configured to generate a second microphone signal 231 on the basis of a photoacoustic excitation of the second gas 221 by the optical radiation 111. By way of example, the second microphone 230 may be designed like the first microphone 130. As described in detail above for the first measurement cell 120 by way of example, the optical radiation 111 entering the second measurement cell 220 leads to a photoacoustic excitation of the second gas 221. Since the second microphone signal 231 represents the pressure change inside the second measurement cell 220, it indicates the amount of energy delivered to the second gas 221 by the optical radiation 111.

Before the optical radiation 111 enters the second measurement cell 220, however, it passes through not only the first measurement cell 120 but also a first area 260, filled with a gas 250 to be examined, that is arranged between the optical emitter 110 and the second measurement cell 220. The first area 260 represents a measuring section for the gas 250 to be examined. The first area 260 may be either a sealed volume filled with the gas 250 to be examined or an open volume (i.e. a volume not physically delimited that permits an exchange of gas with the surroundings). The gas 250 to be examined is meant to be characterized in consideration of its concentration. The concentration can in turn be determined by means of the absorption of the optical radiation 111 by the gas 250 to be examined.

The intensity $I_{31}$ that arises for the optical radiation 111 at the second measurement cell 220 is determined by the absorption coefficient $\varepsilon_2$ of the gas 250 to be examined and the known length $d_2$ of the first area 260, i.e. the path length of the optical radiation 111 through the gas 260 to be examined:

$$I_{31} = I_{12} \cdot e^{-\varepsilon_2 d_2} = I_{11} \cdot e^{-\varepsilon_1 d_1} \cdot e^{-\varepsilon_2 d_2} \tag{4}$$

The absorption coefficient $\varepsilon_2$ is determined by means of the concentration $\eta_2$ of the gas 250 to be examined in the first area 260 and a substance constant $\alpha_2$:

$$\varepsilon_2 = \eta_2 \cdot \alpha_2 \tag{5}$$

Similarly, the absorption coefficients $\varepsilon_1$ and $\varepsilon_3$ of the first gas 121 and of the second gas 221 are also determined by means of the respective concentrations $\eta_1$ and $\eta_3$ of the first gas 121 and of the second gas 221 in the first measurement cell 120 and in the second measurement cell 220 (and also respective substance constants $\alpha_1$ and $\alpha_3$). The concentration $\eta_1$ of the first gas 121 in the first measurement cell 120 may be lower than, the same as, or higher than the concentration $\eta_3$ of the second gas 221 in the second measurement cell 220. The concentration $\eta_1$ of the first gas 121 in the first measurement cell 120 is in this instance chosen such that the optical radiation 111 in the first measurement cell 120 is absorbed only insofar as the intensity $I_{31}$ arriving for the optical radiation 111 at the second measurement cell is still sufficient to excite the second gas 221 photoacoustically after passage through and (partial) absorption by the gas 250 to be examined. The concentration $\eta_1$ of the first gas 121 in the first measurement cell 120 may therefore be chosen depending on the length $d_2$ of the first area 260, inter alia.

As already explained above, the second microphone signal 231 describes the amount of energy delivered to the second gas 221 by the optical radiation 111. The intensity $I_{32}$ remaining for the optical radiation 111 after passage through the second gas 221 (path length $d_3$ of the optical radiation 111 through the second gas 221) can thus be depicted as follows:

$$I_{32} = I_{31} \cdot e^{-\varepsilon_3 d_3} = I_{11} \cdot e^{-\varepsilon_1 d_1} \cdot e^{-\varepsilon_2 d_2} \cdot e^{-\varepsilon_3 d_3} \tag{6}$$

The second microphone signal 231 is therefore used to measure the difference $\Delta I_3$ in the intensities $I_{31}$ and $I_{32}$ of the optical radiation 111:

$$\Delta I_3 = I_{31} - I_{32} = I_{12} \cdot e^{-\varepsilon_2 d_2} - I_{31} \cdot e^{-\varepsilon_3 d_3} = I_{11} \cdot e^{-\varepsilon_1 d_1} \cdot e^{-\varepsilon_2 d_2} - I_{11} \cdot e^{-\varepsilon_1 d_1} \cdot e^{-\varepsilon_2 d_2} \cdot e^{-\varepsilon_3 d_3} \tag{7}$$

The loss of intensity $\Delta I_2$ of the optical radiation 111 on account of the absorption of the optical radiation 111 by the gas 250 to be examined in the first area 260 can be described as follows:

$$\Delta I_2 = I_{12} - I_{31} = I_{11} \cdot e^{-\varepsilon_1 d_1} - I_{12} \cdot e^{-\varepsilon_2 d_2} = I_{11} \cdot e^{-\varepsilon_1 d_1} - I_{11} \cdot e^{-\varepsilon_1 d_1} \cdot e^{-\varepsilon_2 d_2} \tag{8}$$

Using the difference $\Delta I_3$ in the intensities $I_{31}$ and $I_{32}$ that is described by the second microphone signal 231 and using the emission intensity $I_{11}$ of the optical emitter 110 that is described by the first measurement signal 141, or the difference $\Delta I_1$ in the intensities $I_{11}$ and $I_{12}$ that is described by the first microphone signal 131, it is now possible to determine the absorption coefficient $\varepsilon_2$ or the concentration $\eta_2$ of the gas 250 to be examined in the first area 260:

$$\frac{\Delta I_1}{\Delta I_3} = \frac{I_{11} - I_{11} \cdot e^{-\varepsilon_1 d_1}}{I_{11} \cdot e^{-\varepsilon_1 d_1} \cdot e^{-\varepsilon_2 d_2} - I_{11} \cdot e^{-\varepsilon_1 d_1} \cdot e^{-\varepsilon_2 d_2} \cdot e^{-\varepsilon_3 d_3}} = \frac{1 - e^{-\varepsilon_1 d_1}}{e^{-\varepsilon_1 d_1} \cdot e^{-\varepsilon_2 d_2} - e^{-\varepsilon_1 d_1} \cdot e^{-\varepsilon_2 d_2} \cdot e^{-\varepsilon_3 d_3}} \tag{9}$$

$$\varepsilon_2 = \frac{-\ln\left(\frac{\Delta I_3 \cdot e^{-\varepsilon_1 d_1} \cdot (e^{-\varepsilon_1 d_1} - 1)}{\Delta I_1 \cdot e^{-\varepsilon_3 d_3} - 1}\right)}{d_2} \tag{10}$$

$$\eta_2 = \frac{\varepsilon_2}{\alpha_2} = \frac{-\ln\left(\frac{\Delta I_3 \cdot e^{-\varepsilon_1 d_1} \cdot (e^{-\varepsilon_1 d_1} - 1)}{\Delta I_1 \cdot e^{-\varepsilon_3 d_3} - 1}\right)}{d_2 \cdot \alpha_2} \tag{11}$$

Accordingly, the evaluation circuit 140 is further configured to take the second microphone signal 231 and the first microphone signal 131 as a basis for generating a second measurement signal 142 indicating the concentration $\eta_2$ of the gas 250 to be examined in the first area 260.

Apparatus 200 can therefore firstly allow direct measurement of the optical output power of the emitter (optical emitter) 120 at the one or more predetermined wavelengths (e.g. 4.3 µm). Secondly, the apparatus 200 can allow determination of the concentration of the gas 250 to be examined. By way of example, the optical radiation 111 can enter the first hermetic measurement cell 120 through an optical window, said measurement cell containing a defined concentration $CO_2$ (e.g. approximately 1000 parts $CO_2$ per million, ppm). Some of the energy of the optical radiation 111 at 4.3 µm is absorbed and produces a sound wave that is measured by the first microphone 130. The remainder of the radiation passes through the measuring section (i.e. the first area 260) at the concentration of $CO_2$ to be measured or examined and subsequently enters the second measurement cell 220. The latter is again hermetically sealed and contains 100% $CO_2$ and also the second microphone 230. Using analog or digital processing of the output signals from the microphones, the evaluation circuit 140 can determine the concentration of $CO_2$ in the first area 260 independently of the radiation power of the optical emitter 110 in accordance with the principles above.

Use of the ABC method or of other calibration methods is thus not necessary. Similarly, a direct measurement of the radiation power at one or more wavelengths of interest (e.g. 4.3 µm) is possible. In other words: apparatus 200 can allow referencing to the relevant radiation power. Additionally, apparatus 200 allows measurement of the radiation power in a single optical radiation path and hence under the same conditions as also prevail for the second measurement cell.

Figure 2:
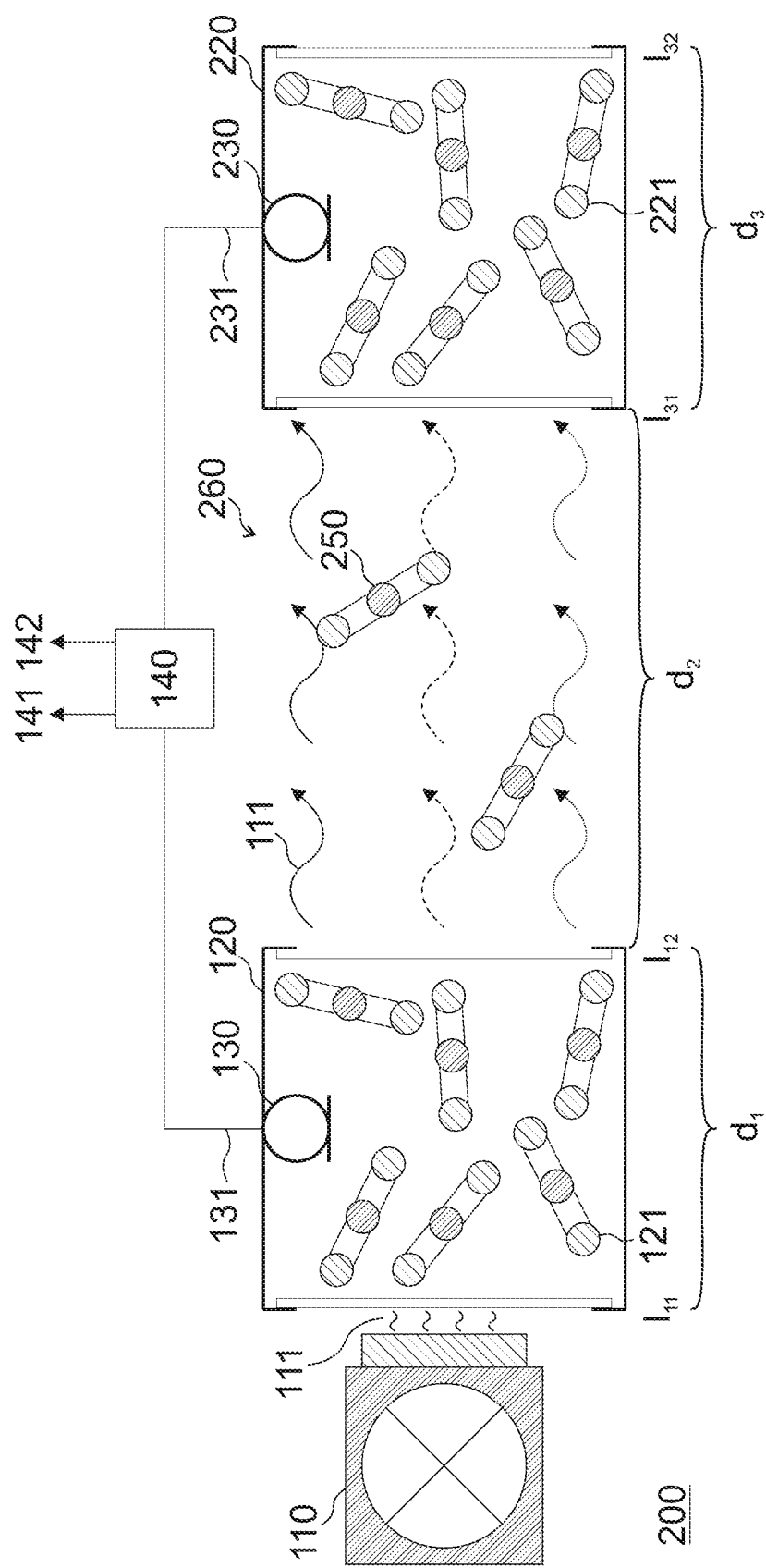
FIG. 2 shows a second exemplary embodiment of an apparatus using the photoacoustic effect.

As FIG. 2 shows, the first measurement cell 120 may be arranged between the optical emitter 110 and the area 260 filled with the gas 250 to be examined, which means that the first measurement cell 120, the area 260 filled with the gas 250 to be examined and the second measurement cell 220 are arranged in the same optical path or beam path.

Figure 3:
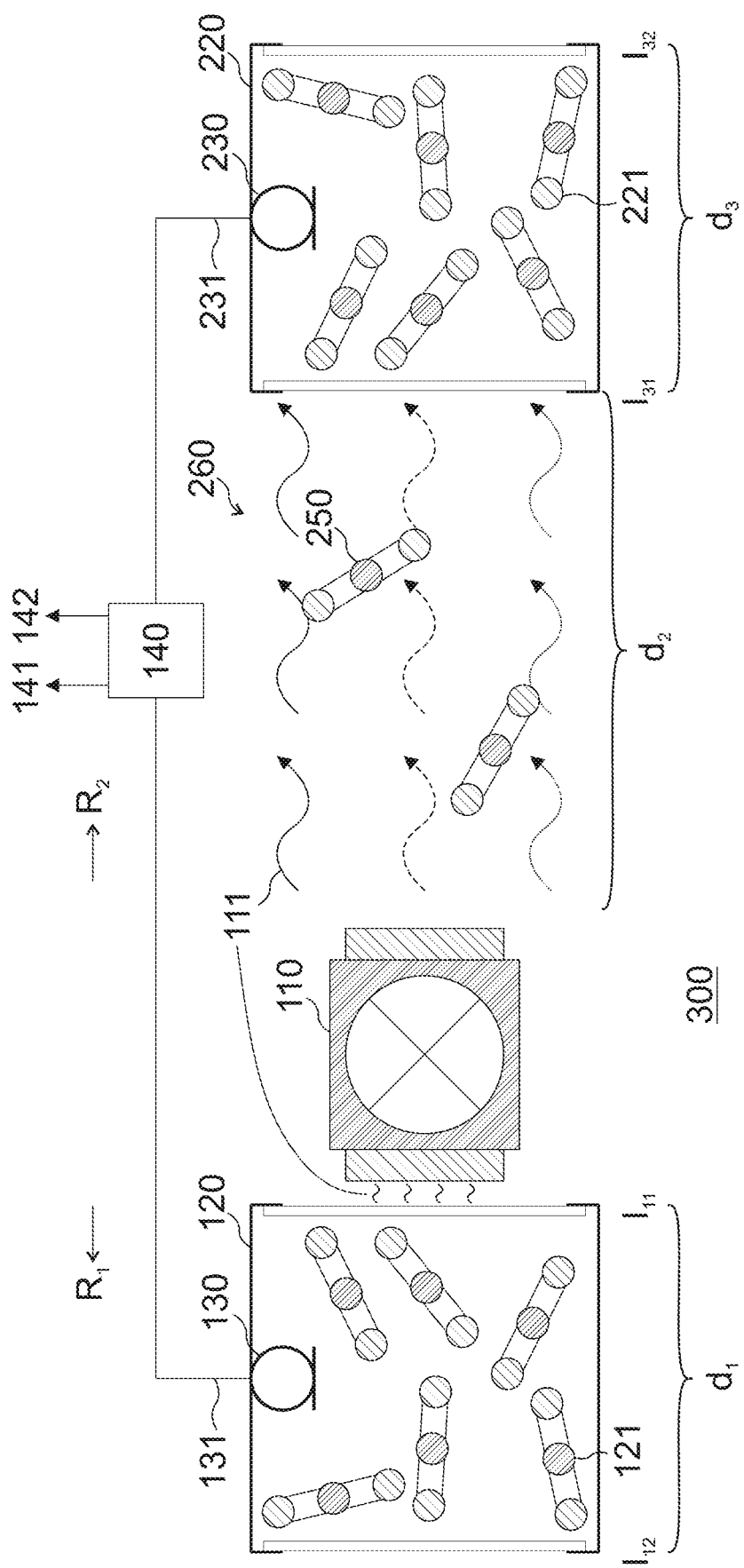
FIG. 3 shows a third exemplary embodiment of an apparatus using the photoacoustic effect.

Alternatively, the first measurement cell 120 and the second measurement cell 220 may be arranged in different optical paths or beam paths. This is shown in FIG. 3. In the case of the apparatus 300 shown in FIG. 3, the first measurement cell 120 is arranged in a first spatial direction $R_1$ as seen from the optical emitter 110 and the second measurement cell 220 is arranged in a second spatial direction $R_2$, which is different than the first spatial direction $R_1$, as seen from the optical emitter 110.

In the design shown in FIG. 3, the optical emitter 110 is configured to emit the optical radiation along the first spatial direction $R_1$ and the second spatial direction $R_2$. By way of example, the optical emitter 110 may be in the form of a thermal emitter emitting in two opposite directions. In other words: the optical emitter 110 can emit e.g. symmetrically to the rear and to the front. Accordingly, the first measurement cell 120 may be arranged at the back of the optical emitter 110 (direction $R_1$) while the second measurement cell 220 is arranged on the front of the optical emitter 110 (direction $R_2$). The design of the apparatus 300 can avoid influencing of the optical path for concentration measurement, i.e. passage of the optical radiation 111 through the area 260 filled with the gas 250 to be examined to the second measurement cell 220, by the first measurement cell 120 for measurement of the emission intensity of the optical emitter 110.

The first spatial direction $R_1$ and the second spatial direction $R_2$ may be oriented arbitrarily in relation to one another. Besides the opposite orientation of the spatial directions $R_1$ and $R_2$ that are shown in FIG. 3, said directions may e.g. also be oriented at right angles to one another.

Figures 1, 4:
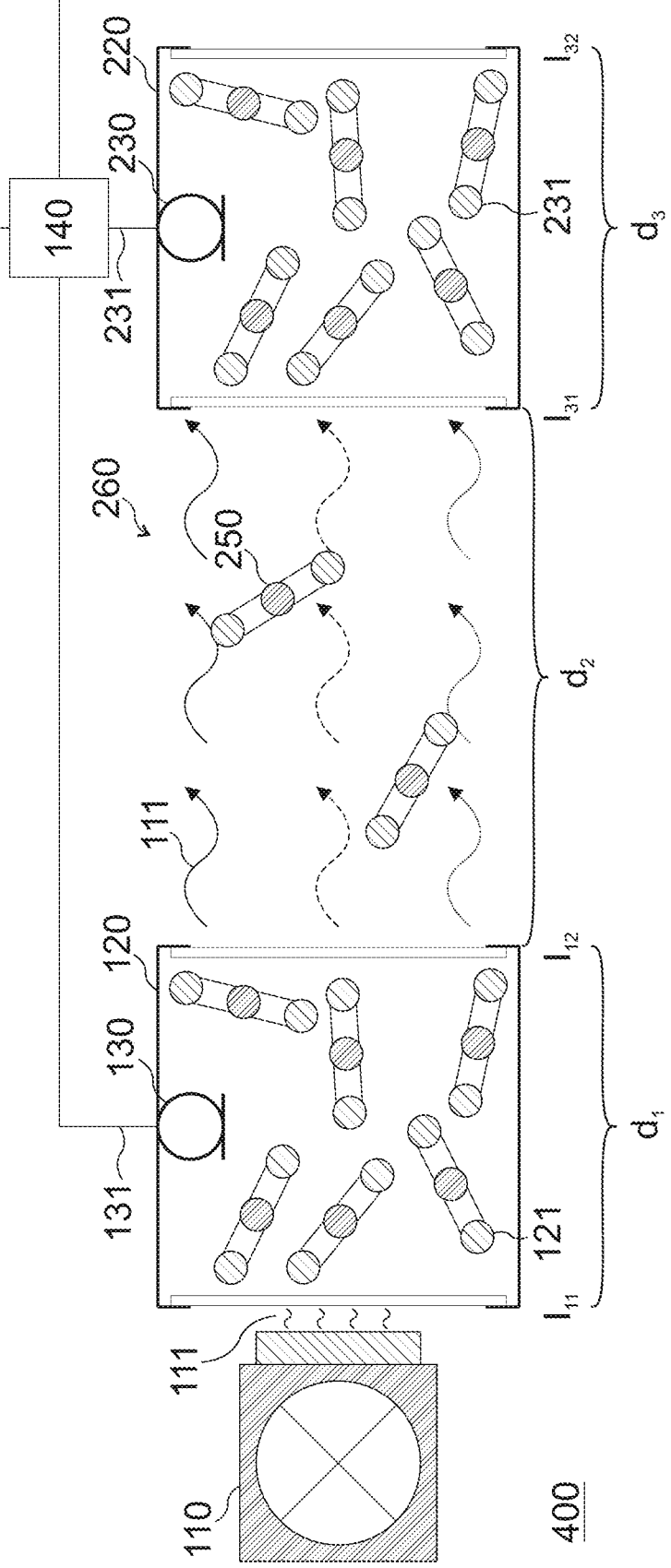
Figures 2, 4:
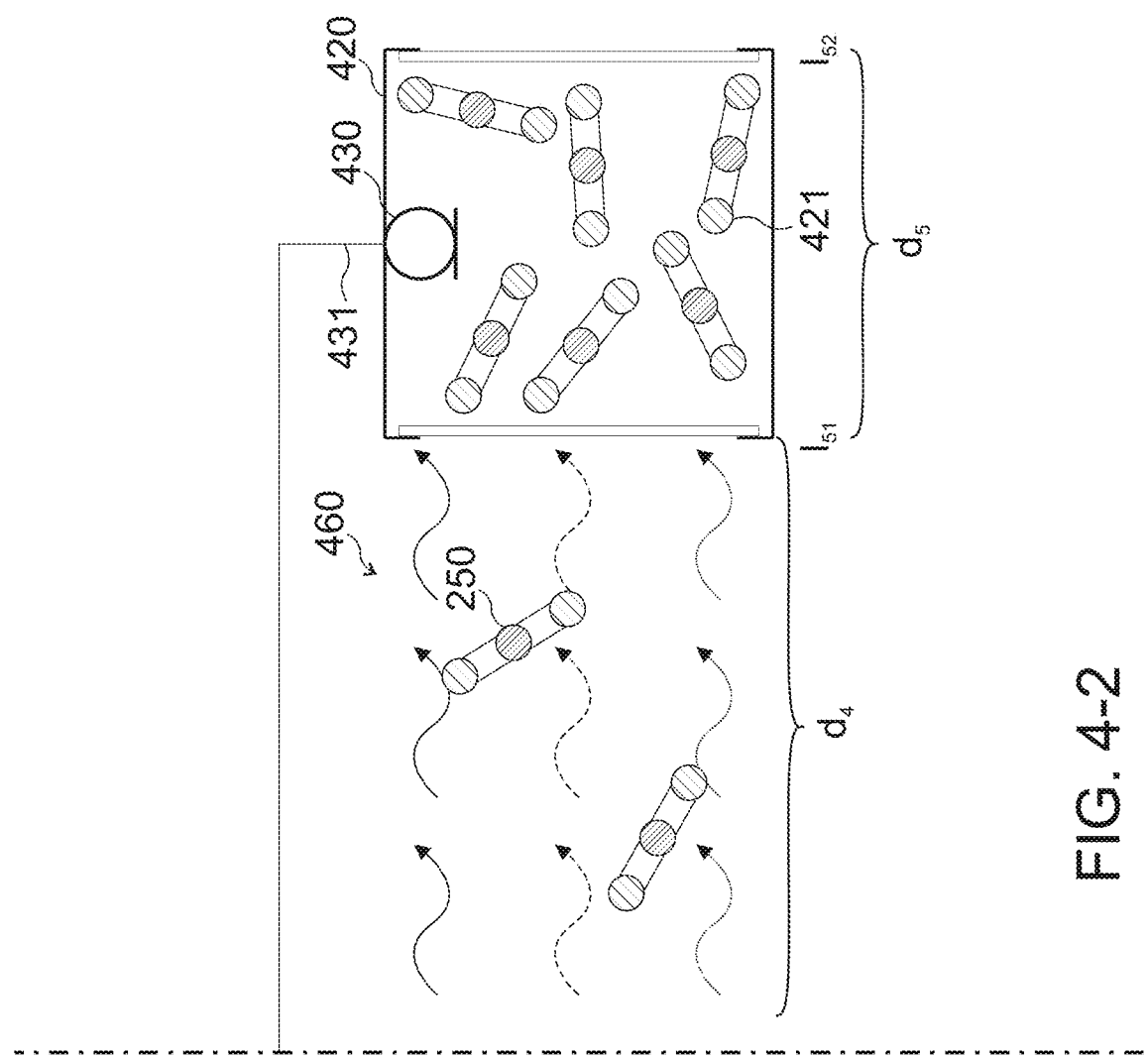

FIG. 4, which includes FIGS. 4-1 and 4-2, shows a further apparatus 400 using an additional third hermetically sealed measurement cell 420. Like apparatus 200 too, the apparatus 400 comprises the optical emitter 110, the first measurement cell 120, the second measurement cell 220 and the first area 260 with the gas 250 to be examined. To avoid unnecessary repetitions, these components are thus not described again below. The description that follows concentrates on the additional or further components of the apparatus 400.

The third hermetically sealed measurement cell 420 is filled with a third gas 421 configured to absorb the optical radiation 111 at the one or more predetermined wavelengths. In other words: radiation components of the optical radiation 111 at the one or more predetermined wavelengths interact with the third gas 421 and in so doing deliver at least some of their energy to the third gas 421. By way of example, the third gas may be configured to absorb infrared radiation at least partially. The first gas 121, the second gas 221 and the third gas 421 can have the same chemical composition.

Additionally, the apparatus 400 comprises a third microphone 430 arranged in the third measurement cell 420. The third microphone 430 is configured to generate a third microphone signal 431 on the basis of a photoacoustic excitation of the third gas 431 by the optical radiation 111. By way of example, the third microphone 430 may be designed like the first microphone 130. As described in detail above for the first measurement cell 120 by way of example, the optical radiation 111 entering the third measurement cell 420 leads to a photoacoustic excitation of the third gas 431. Since the third microphone signal 431 represents the pressure change inside the third measurement cell 420, it indicates the amount of energy delivered to the third gas 421 by the optical radiation 111.

Before the optical radiation 111 enters the third measurement cell 420, however, it passes through not only the first measurement cell 120, the first area 260 filled with the gas 250 to be examined and the second measurement cell 220 but also a second area 460, filled with the gas 250 to be examined, that is arranged between the second measurement cell 220 and the third measurement cell 420. The second area 460 represents a further measuring section for the gas 250 to be examined. The second area 460 may be either a sealed volume filled with the gas 250 to be examined or an open volume (i.e. a volume not physically delimited that permits an exchange of gas with the surroundings).

The length $d_4$ of the second area 460, i.e. the path length of the optical radiation 111 through the gas 250 to be examined that is in the second area, may initially be unknown. The length $d_4$ can be determined by means of the absorption of the optical radiation 111 by the gas 250 to be examined in the second area 460. In this instance, it can initially be assumed that the concentration $\eta_4$ and hence also the absorption coefficient $\varepsilon_4$ of the gas 250 to be examined are substantially the same in the first area 260 and in the second area 460 (i.e. $\varepsilon_4 \cong \varepsilon_2$).

The intensity $I_{51}$ arriving for the optical radiation 111 at the third measurement cell 420 is therefore determined by the length $d_4$ of the second area 460, i.e. the path length of the optical radiation 111 through the gas 250 to be examined in the second area 460:

$$I_{51}=I_{32} \cdot e^{-\varepsilon_4 d_4} = I_{11} \cdot e^{-\varepsilon_1 d_1} \cdot e^{-\varepsilon_2 d_2} \cdot e^{-\varepsilon_3 d_3} \cdot e^{-\varepsilon_4 d_4} \quad (12)$$

As already explained above, the third microphone signal 431 describes the amount of energy delivered to the third gas 421 by the optical radiation 111. The intensity $I_{52}$ remaining for the optical radiation 111 after passage through the third gas 421 (known path length $d_5$ of the optical radiation 111 through the third gas 421 with a known absorption coefficient $\varepsilon_5$) can thus be depicted as follows:

$$I_{52}=I_{51} \cdot e^{-\varepsilon_5 d_5} = I_{11} \cdot e^{-\varepsilon_1 d_1} \cdot e^{-\varepsilon_2 d_2} \cdot e^{-\varepsilon_3 d_3} \cdot e^{-\varepsilon_4 d_4} \cdot e^{-\varepsilon_5 d_5} \quad (13)$$

The third microphone signal 431 is therefore used to measure the difference $\Delta I_5$ in the intensities $I_{51}$ and $I_{52}$ of the optical radiation 111:

$$\Delta I_5 = I_{51} - I_{52} = I_{32} \cdot e^{-\varepsilon_4 d_4} - I_{51} \cdot e^{-\varepsilon_5 d_5} = I_{11} \cdot e^{-\varepsilon_1 d_1} \cdot e^{-\varepsilon_2 d_2} \cdot e^{-\varepsilon_3 d_3} \cdot e^{-\varepsilon_4 d_4} - I_{11} \cdot e^{-\varepsilon_1 d_1} \cdot e^{-\varepsilon_2 d_2} \cdot e^{-\varepsilon_3 d_3} \cdot e^{-\varepsilon_4 d_4} \cdot e^{-\varepsilon_5 d_5} \quad (14)$$

Using the difference $\Delta I_5$ in the intensities $I_{51}$ and $I_{52}$ that is described by the third microphone signal and using the difference $\Delta I_3$ in the intensities $I_{31}$ and $I_{32}$ that are described by the second microphone signal 231, it is now possible to determine the one distance $d_4$ between the second measurement cell 220 and the third measurement cell 420:

$$\frac{\Delta I_3}{\Delta I_5} = \frac{I_{11} \cdot e^{-\varepsilon_1 d_1} \cdot e^{-\varepsilon_2 d_2} - I_{11} \cdot e^{-\varepsilon_1 d_1} \cdot e^{-\varepsilon_2 d_2} \cdot e^{-\varepsilon_3 d_3}}{I_{11} \cdot e^{-\varepsilon_1 d_1} \cdot e^{-\varepsilon_2 d_2} \cdot e^{-\varepsilon_3 d_3} \cdot e^{-\varepsilon_4 d_4} - I_{11} \cdot e^{-\varepsilon_1 d_1} \cdot e^{-\varepsilon_2 d_2} \cdot e^{-\varepsilon_3 d_3} \cdot e^{-\varepsilon_4 d_4} \cdot e^{-\varepsilon_5 d_5}} =$$

$$\frac{e^{-\varepsilon_1 d_1} \cdot e^{-\varepsilon_2 d_2} - e^{-\varepsilon_1 d_1} \cdot e^{-\varepsilon_2 d_2} \cdot e^{-\varepsilon_3 d_3}}{e^{-\varepsilon_1 d_1} \cdot e^{-\varepsilon_2 d_2} \cdot e^{-\varepsilon_3 d_3} \cdot e^{-\varepsilon_4 d_4} - e^{-\varepsilon_1 d_1} \cdot e^{-\varepsilon_2 d_2} \cdot e^{-\varepsilon_3 d_3} \cdot e^{-\varepsilon_4 d_4} \cdot e^{-\varepsilon_5 d_5}} \quad (15)$$

$$d_4 = \frac{-\ln\left(\frac{\Delta I_5 \cdot (1 - e^{-\varepsilon_3 d_3})}{\Delta I_3 \cdot (e^{-\varepsilon_3 d_3} - e^{-\varepsilon_3 d_3} \cdot e^{-\varepsilon_5 d_5})}\right)}{\varepsilon_4} = \frac{-\ln\left(\frac{\Delta I_5 \cdot (1 - e^{-\varepsilon_3 d_3})}{\Delta I_3 \cdot (e^{-\varepsilon_3 d_3} - e^{-\varepsilon_3 d_3} \cdot e^{-\varepsilon_5 d_5})}\right)}{\varepsilon_2} \quad (16)$$

Accordingly, the evaluation circuit 140 is further configured to take the third microphone signal 431 and the second measurement signal 142 as a basis for generating a third measurement signal 143 indicating the distance $d_4$ between the second measurement cell 220 and third measurement cell 420.

The first two measurement cells 120, 220 of the apparatus 200 can thus ascertain the concentration of the gas to be examined (e.g. $CO_2$). Using the known concentration, measurement of the remaining energy reaching the third measurement cell 420 can be used to measure the distance between the second and third measurement cells.

The ascertained distance $d_4$ between the second measurement cell 220 and the third measurement cell 420 can subsequently be used in order to use the apparatus 400 as a redundant detection system.

Analogously to expression (11) above, the concentration $\eta_4$ of the gas 250 to be examined in the second area 460 can be determined based on the second microphone signal 231 and the third microphone signal 431 using the ascertained distance $d_4$ between the second measurement cell 220 and the third measurement cell 420:

$$\eta_4 = \frac{\varepsilon_4}{\alpha_2} = \frac{-\ln\left(\frac{\Delta I_5 \cdot e^{-\varepsilon_3 d_3} \cdot (e^{-\varepsilon_3 d_3} - 1)}{\Delta I_3 \cdot e^{-\varepsilon_5 d_5} - 1}\right)}{d_4 \cdot a_2} \quad (11)$$

Accordingly, the evaluation circuit 140 is further configured to take the second microphone signal 231 and the third measurement signal 143 as a basis for generating a fourth measurement signal 144 indicating the concentration $\eta_4$ of the gas 250 to be examined in the second area 460.

As such, reciprocal monitoring of the concentration measurements can be effected by the evaluation circuit 140. In other words: the evaluation circuit 140 may be configured to compare the concentration $\eta_2$ of the gas 250 to be examined in the first area 260 with the concentration $\eta_4$ of the gas 250 to be examined in the second area 460. If the concentration $\eta_2$ of the gas 250 to be examined in the first area 260 differs from the concentration $\eta_4$ of the gas 250 to be examined in the second area 460 by more than a prescribed (absolute or relative) threshold value, the evaluation circuit 140 may further be configured to output an error signal or warning signal, for example.

Similarly, to what is shown in FIG. 3 for the apparatus 300, some exemplary embodiments can also involve the apparatus 400 having the first measurement cell 120 arranged in a first spatial direction as seen from the optical emitter 110, while the second measurement cell 220 is arranged in a second spatial direction, which is different than the first spatial direction, as seen from the optical emitter 110.

Figures 2, 5:
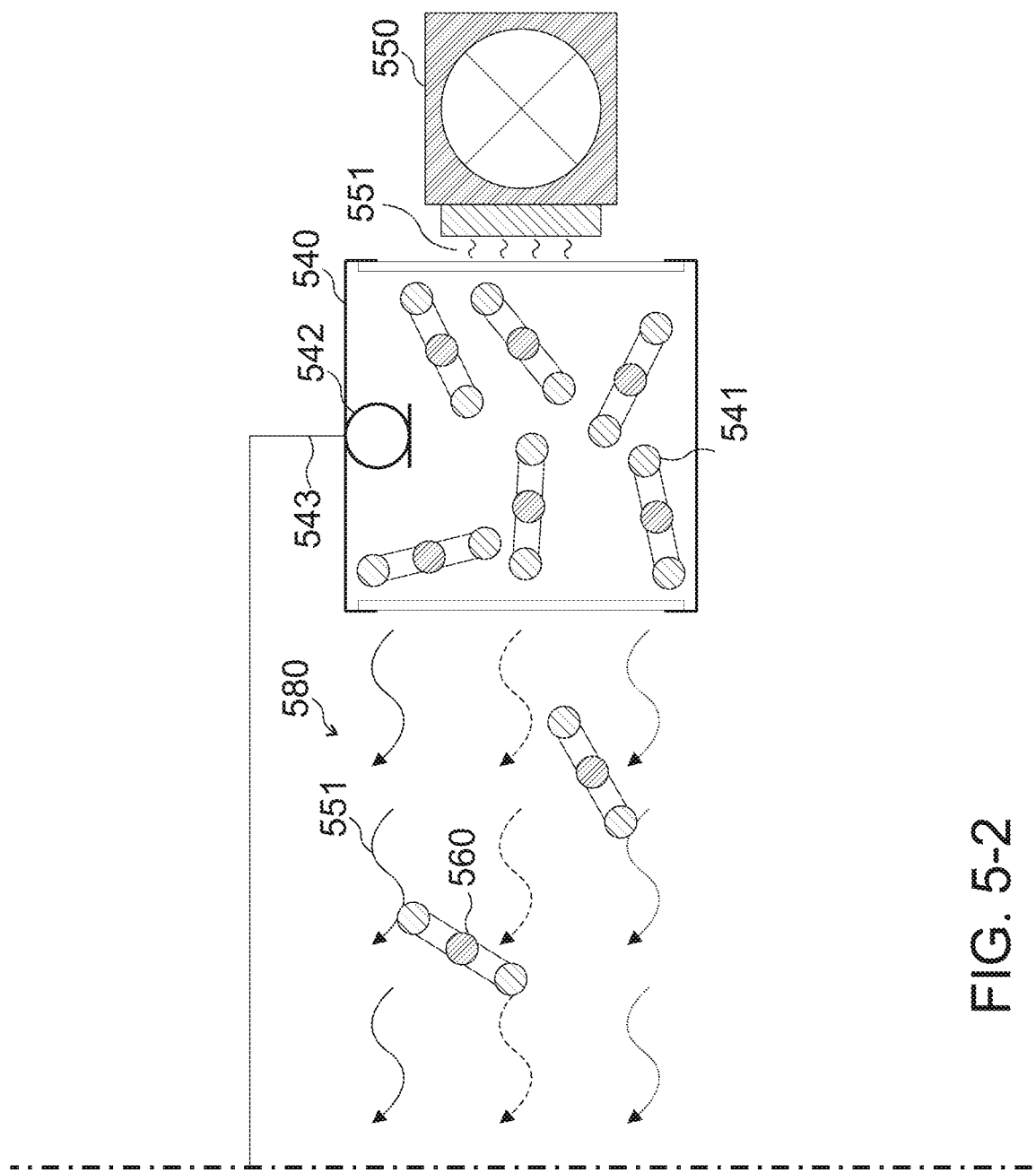

A further apparatus 500 with redundant design is shown in FIG. 5, which includes FIGS. 5-1 and 5-2. Apparatus 500 comprises a first optical emitter 510 and a second optical emitter 550. The first optical emitter 510 is configured to emit first optical radiation 511 at a first time. The second optical emitter 550 is configured to emit second optical radiation 550 at a second time. The first optical emitter 510 and the second optical emitter 500 may in this instance be designed like the optical emitter 110 described above in connection with FIG. 1A. The first optical radiation 511 may be identical to or different than the second optical radiation 551. Both optical radiations 511 and 551 can comprise either infrared radiation or radiation in the visible range.

Further, apparatus 500 comprises three hermetically sealed measurement cells 520, 530 and 540 arranged in series between the first and second optical emitters 510, 550. The three hermetically sealed measurement cells 520, 530 and 540 are each filled with a gas 521, 531 and 541, respectively, configured to absorb the first optical radiation 511 and the second optical radiation 551 at one or more predetermined wavelengths in each case. The gases 521, 531 and 541 can have the same chemical composition. The concentrations of the gases 521, 531 and 541 in the respective measurement cells 520, 530 and 540 may be the same or different. The gases 521, 531 and 541 may be embodied as described in detail above for the first gas 121 by way of example.

Each of the three measurement cells 520, 530 and 540 has a respective microphone 522, 532 and 542 arranged in it. The microphone 522, 532 or 542 is in each case configured to generate a respective microphone signal 523, 533 or 543 on the basis of a photoacoustic excitation of the gas 521, 531 or 541 in the respective measurement cell 520, 530 or 540 by the first optical radiation 511 or the second optical radiation 551. The microphones 522, 532 and 542 may be designed like the first microphone 130 described in connection with apparatus 100A, for example. As described in detail above in connection with apparatus 100A for the first measurement cell 120 by way of example, the optical radiation 511 or 551 entering the respective measurement cell 520, 530 or 540 leads to a photoacoustic excitation of the respective gas 521, 531 or 541. Since the respective microphone signal 523, 533 or 543 represents the pressure change inside the respective measurement cell 520, 530 or 540, it indicates the amount of energy delivered to the respective gas 521, 531 or 541 by the optical radiation 511 or 551.

Additionally, the apparatus 500 comprises two areas 570 and 580 filled with a gas 560 to be examined that are arranged between different pairs of the three measurement cells 520, 530 and 540. The first area 570 of the two areas 570 and 580 filled with the gas 560 to be examined is arranged between the first measurement cell 520 and the second measurement cell 530, while the second area 580 of the two areas 570 and 580 filled with the gas 560 to be examined is arranged between the second measurement cell 530 and the third measurement cell 540.

According to the principles described above, it is now possible for an evaluation circuit 590 to determine the emission intensity of the first optical emitter 510 at the one or more predetermined wavelengths based on a change in the microphone signal 523 of the measurement cell 520 after the first time. Accordingly, the evaluation circuit 590 can, on the basis of the principles described above, also determine the emission intensity of the second optical emitter 550 at the one or more predetermined wavelengths based on a change in the microphone signal 543 of the measurement cell 540 after the second time. In other words: the evaluation circuit 590 is configured to determine the emission intensity of the first optical emitter 510 at the one or more predetermined wavelengths based on a change in a first of the microphone signals 523, 533 and 543 after the first time and to determine an emission intensity of the second optical emitter 550 at the one or more predetermined wavelengths based on a change in a second of the microphone signals 523, 533 and 543 after the second time.

The first time and the second time for emission of the first optical radiation 511 and of the second optical radiation 551, respectively, are in this instance chosen such that the gases 521, 531 and 541 in the measurement cells 520, 530 and 540, respectively, are (now) not excited photoacoustically by the respective other optical radiation.

Owing to the redundant or symmetrical design of the apparatus 500, it is additionally possible for the concentration of the gas 560 to be examined in the two areas 570 and 580 to be provided independently of knowledge of the intervals (distances) between successive measurement cells of the three measurement cells 520, 530 and 540. According to the principles described above, the evaluation circuit 590 can determine the concentration of the gas 560 to be examined in the two areas 570 and 580 and the intervals between successive measurement cells of the three measurement cells 520, 530 and 540 at the same time.

In other words: the evaluation circuit 590 may further be configured to determine at least one interval between successive measurement cells of the three measurement cells 520, 530 and 540 based on the changes in the microphone signals 523, 533 and 543 after the first time and the changes in the microphone signals 523, 533 and 543 after the second time.

Similarly, the evaluation circuit 590 may further be configured to determine the concentration of the gas to be examined in at least one of the two areas 570 and 580 based on the changes in the microphone signals 523, 533 and 543 after the first time and the changes in the microphone signals 523, 533 and 543 after the second time.

Apparatus 500 is therefore a redundant system for the detector and the emitter that can be arranged in variable fashion. The measuring section of the apparatus 500, comprising two emitters and three measurement cells (measurement chambers), allows absolute concentration measurement. Besides the advantages already cited above for the apparatuses 100 to 400, the design of apparatus 500 allows concentration measurement, even if the intervals between the measurement cells are not known or variable. Owing to the excitation by means of the two optical emitters 510 and 550 in alternation, the outer measurement cells 520 and 540 alternate in their function as emitter reference or interval measurement.

Apparatus 500 (besides further apparatuses described herein) can therefore be understood as photoacoustic system for emitter monitoring and distance measurement that is based on multiple chambers situated in the same optical path.

Figures 2, 6:
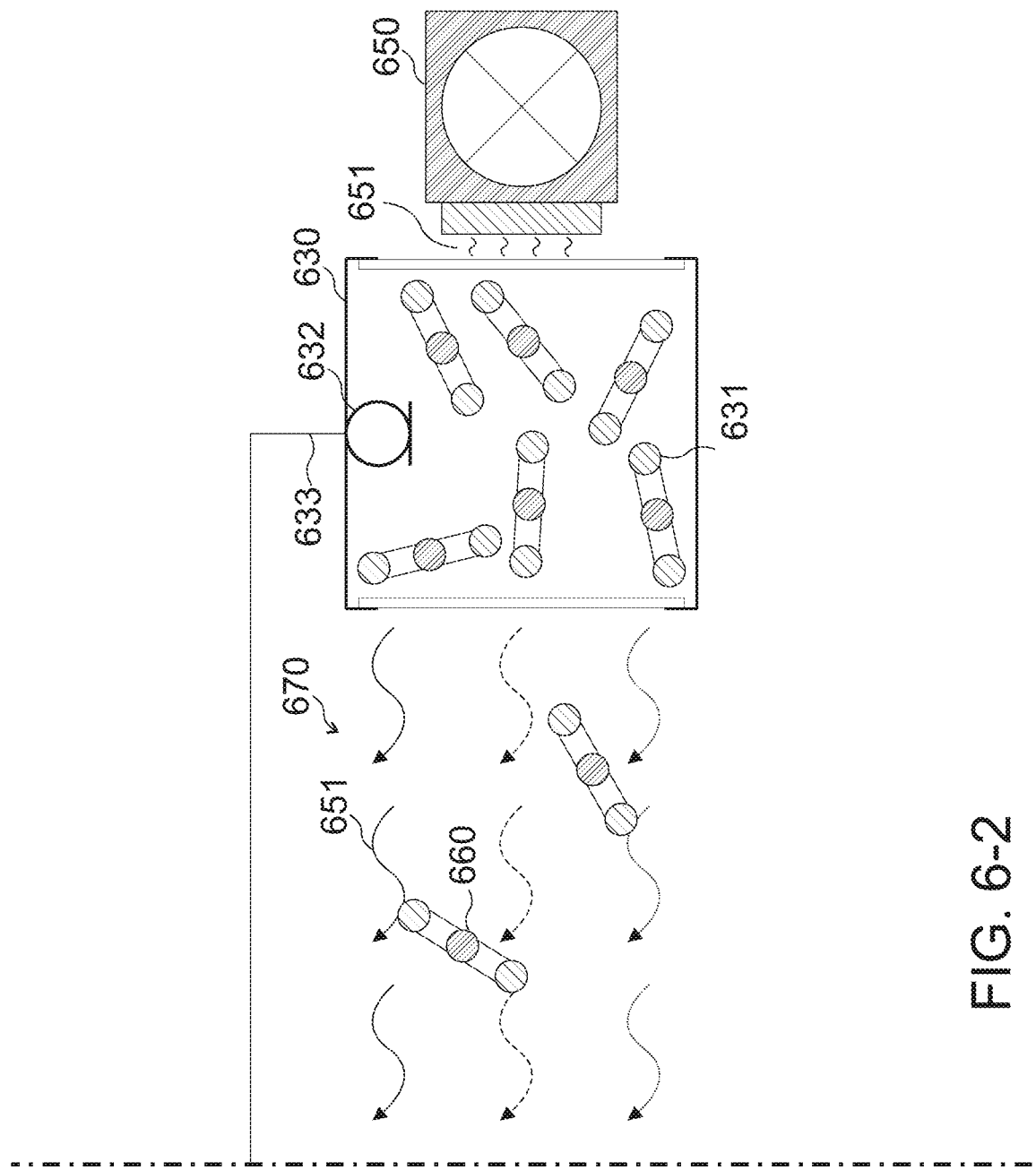

FIG. 6, which includes FIGS. 6-1 and 6-2, shows yet another apparatus 600 of redundant design that uses just two measurement cells.

Apparatus 600 comprises a first optical emitter 610 and a second optical emitter 650. The first optical emitter 610 is configured to emit first optical radiation 611 at a first time. The second optical emitter 650 is configured to emit second optical radiation 650 at a second time. The first optical emitter 610 and the second optical emitter 650 may in this case be designed like the optical emitter 610 described above in connection with FIG. 1A. The first optical radiation 611 may be identical to or different than the second optical radiation 651. Both optical radiations 611 and 651 can comprise either infrared radiation or radiation in the visible range.

Further, apparatus 600 comprises two hermetically sealed measurement cells 620 and 630 arranged in series between the first and second optical emitters 610, 650. The two hermetically sealed measurement cells 620 and 630 are each filled with a gas 621 and 631, respectively, configured to absorb the first optical radiation 611 and the second optical radiation 651 at one or more predetermined wavelengths in each case. The gases 621 and 631 can have the same chemical composition. The concentrations of the gases 621 and 631 in the respective measurement cells 620 and 630, respectively, may be the same or different. The gases 621 and 631 may be embodied as described in detail above for the first gas 121 by way of example.

Each of the two measurement cells 620 and 630 has a respective microphone 622 or 632 arranged in it. The microphone 622 or 632 is in each case configured to generate a respective microphone signal 623 or 633 on the basis of a photoacoustic excitation of the gas 621 or 631 in the respective measurement cell 620 or 630 by the first optical radiation 611 or the second optical radiation 651. The microphones 622 and 632 may be designed like the first microphone 130 described in connection with apparatus 100A, for example. As described in detail above in connection with apparatus 100A for the first measurement cell 120 by way of example, the optical radiation 611 or 651 entering the respective measurement cell 620 or 630 leads to a photoacoustic excitation of the respective gas 621 or 631. Since the respective microphone signal 623 or 633 represents the pressure change inside the respective measurement cell 620 or 630, it indicates the amount of energy delivered to the respective gas 621 or 631 by the optical radiation 611 or 651.

Additionally, the apparatus 600 comprises an area 670, filled with a gas 660 to be examined, that is arranged between the two measurement cells 620 and 630.

According to the principles described above, an evaluation circuit 690 can now determine the emission intensity of the first optical emitter 610 at the one or more predetermined wavelengths based on a change in the microphone signal 623 of the measurement cells 620 after the first time. Accordingly, the evaluation circuit 690 can also determine the emission intensity of the second optical emitter 650 at the one or more predetermined wavelengths based on a change in the microphone signal 633 of the measurement cell 630 after the second time according to the principles described above. In other words: the evaluation circuit 690 is configured to determine the emission intensity of the first optical emitters 610 at the one or more predetermined wavelengths based on a change in a first of the microphone signals 623 and 633 after the first time and to determine an emission intensity of the second optical emitter 650 at the one or more predetermined wavelengths based on a change in a second of the microphone signals 623 and 633 after the second time.

The first time and the second time for emission of the first optical radiation 611 and of the second optical radiation 651, respectively, are in this case chosen such that the gases 621 and 631 in the measurement cells 620 and 630, respectively, are (now) not excited photoacoustically by the respective other optical radiation.

According to the principles described above, the evaluation circuit 690 can determine the concentration of the gas 660 to be examined in the area 670. In other words: the evaluation circuit 690 may further be configured to determine the concentration of the gas to be examined in the area 670 based on the changes in the microphone signals 623 and 633 after the first time and the changes in the microphone signals 623 and 633 after the second time.

Figure 7:
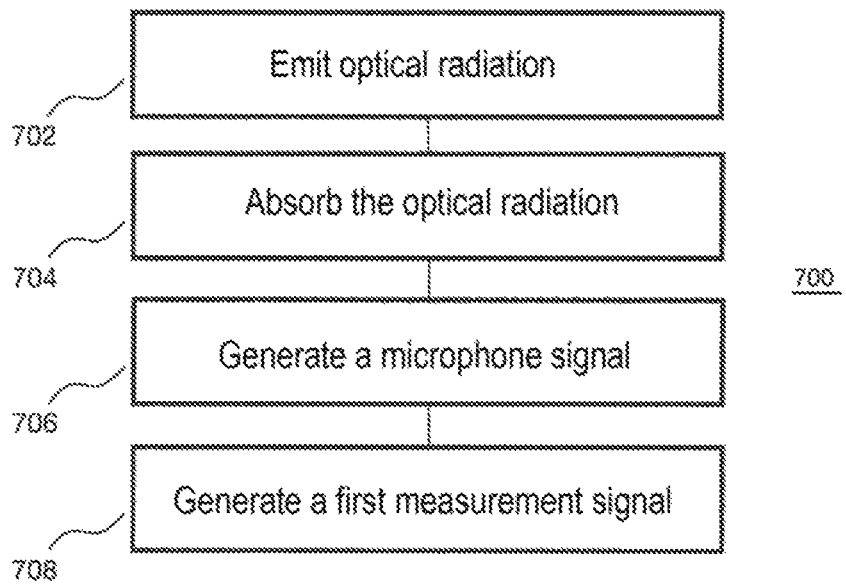
FIG. 7 shows a flowchart for a first exemplary embodiment of a method using the photoacoustic effect.
Figure 8:
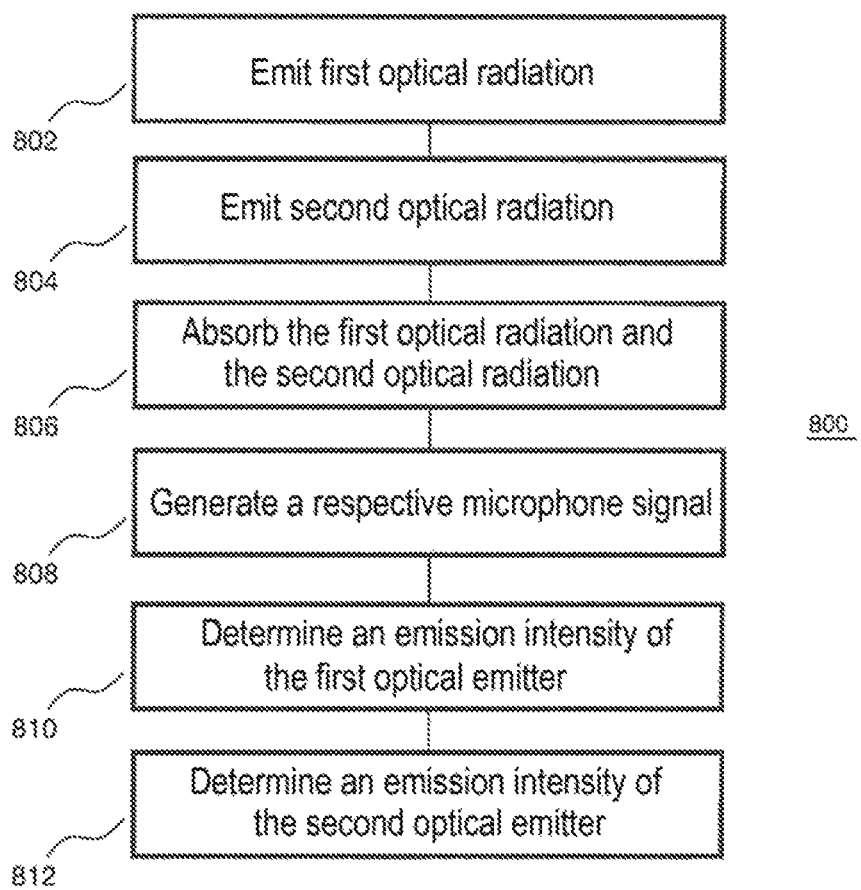
FIG. 8 shows a flowchart for a second exemplary embodiment of a method using the photoacoustic effect.

In order to summarize the above-described aspects relating to the use of the photoacoustic effect again, FIG. 7 and FIG. 8 show flowcharts for methods using the photoacoustic effect.

FIG. 7 shows a flowchart for a first method 700, comprising emitting 702 optical radiation by means of an optical emitter. Method 700 also comprises absorbing 704 the optical radiation at one or more predetermined wavelengths by means of a first gas that is in a first hermetically sealed measurement cell. Additionally, method 700 comprises generating 706 a first microphone signal on the basis of a photoacoustic excitation of the first gas by the optical radiation by means of a microphone arranged in the measurement cell. Method 700 further comprises generating 708 a first measurement signal, indicating an emission intensity of the optical emitter at the one or more predetermined wavelengths, based on the first microphone signal.

Further details and aspects of the method are described above in connection with further exemplary embodiments (e.g. FIGS. 1 to 4). The method can comprise one or more optional features according to the further exemplary embodiments.

Also, FIG. 8 shows another flowchart for a second method 800, comprising emitting 802 first optical radiation at a first time by means of a first optical emitter and emitting 804 second optical radiation at a second time by means of a second optical emitter. Additionally, method 800 comprises absorbing 806 the first optical radiation and the second optical radiation at one or more predetermined wavelengths by means of a gas that is in at least two hermetically sealed measurement cells. The at least two measurement cells are arranged in series between the first and second optical emitters, at least one area filled with a gas to be examined being arranged between the at least two measurement cells. Method 800 further comprises generating 808 a respective microphone signal on the basis of a photoacoustic excitation of the gas in each of the at least two measurement cells by the first optical radiation or the second optical radiation by means of a respective microphone arranged in the measurement cell. Also, method 800 comprises determining 810 an emission intensity of the first optical emitter at the one or more predetermined wavelengths based on a change in a first of the microphone signals after the first time. Similarly, method 800 comprises determining 812 an emission intensity of the second optical emitter at the one or more predetermined wavelengths based on a change in a second of the microphone signals after the second time.

Further details and aspects of the method are described above in connection with further exemplary embodiments (e.g. FIG. 5 and FIG. 6). The method can comprise one or more optional features according to the further exemplary embodiments.

In the exemplary embodiments described above, each of the measurement cells can have not only the microphone but also further secondary sensors for compensating for environmental influences (e.g. temperature sensor or pressure sensor). Additionally, each of the measurement cells can have one or more further microphones generating a microphone signal on the basis of a photoacoustic excitation of the respective gas in the measurement cell by the optical radiation. The further microphone signals can be used by the evaluation circuit of the respective apparatus for analyzing the pressure measurement in the measurement cell, for example.

Although CO2 has often been described as an example of the gases in the measurement cells or of the gas to be examined in the exemplary embodiments above, it goes without saying that use of the photoacoustic principle is not restricted to CO2. Rather, instead of CO2, any other suitable gas can be used (see examples described in connection with apparatus 100A).

The aspects and features that have been described together with one or more of the examples and figures detailed above can also be combined with one or more of the other examples in order to replace an identical feature of the other example or in order to introduce the feature into the other example additionally.

The description and drawings present only the principles of the disclosure. Additionally, all examples mentioned here are fundamentally intended to be used expressly only for teaching purposes, in order to assist the reader in understanding the principles of the disclosure and the concepts contributed by the inventor(s) for further development of the art. All statements herein regarding principles, aspects and examples of the disclosure and also concrete examples thereof are intended to encompass the counterparts thereof.

It goes without saying that the disclosure of multiple steps, processes, operations or functions disclosed in the description or the claims should not be interpreted as being in a specific order, unless explicitly or implicitly indicated otherwise, e.g. for technical reasons. The disclosure of multiple steps or functions thus does not limit them to a specific order, unless said steps or functions are not interchangeable for technical reasons. Further, in some examples, an individual step, function, process or operation can include multiple substeps, sub-functions, sub-processes or sub-operations and/or can be subdivided into them. Such substeps may be included and be part of the disclosure of said individual step, provided that they are not explicitly excluded.

Furthermore, the claims that follow are hereby incorporated in the detailed description, where each claim may stand alone as a separate example. While each claim may stand alone as a separate example, it should be borne in mind that although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. An apparatus, comprising:
    an optical emitter configured to emit optical radiation;
    a first hermetically sealed measurement cell filled with a first gas, the first gas configured to absorb the optical radiation at least partially at one or more predetermined wavelengths;
    a first microphone arranged in the first measurement cell and configured to generate a first microphone signal on a basis of a photoacoustic excitation of the first gas by the optical radiation; and
    an evaluation circuit configured to take the first microphone signal as a basis for generating a first measurement signal indicating an emission intensity of the optical emitter at the one or more predetermined wavelengths.

2. The apparatus as claimed in claim 1, wherein:
    the optical radiation comprises infrared radiation, and
    the first gas is configured to absorb the infrared radiation at least partially.

3. The apparatus as claimed in claim 1, wherein a vacuum or a gaseous atmosphere that does not absorb the optical radiation at the one or more predetermined wavelengths prevails in a space between the optical emitter and the first measurement cell.

4. The apparatus as claimed in claim 1, wherein the optical emitter is arranged in the first measurement cell.

5. The apparatus as claimed in claim 1, further comprising:
- a second hermetically sealed measurement cell filled with a second gas, the second gas being configured to absorb the optical radiation at the one or more predetermined wavelengths;
- a first area, filled with a gas to be examined, that is arranged between the optical emitter and the second measurement cell; and
- a second microphone arranged in the second measurement cell and configured to generate a second microphone signal on the basis of a photoacoustic excitation of the second gas by the optical radiation,
- wherein the evaluation circuit is further configured to take the second microphone signal and the first microphone signal as a basis for generating a second measurement signal indicating a concentration of the gas to be examined in the first area.

6. The apparatus as claimed in claim 5, wherein the first measurement cell is arranged between the optical emitter and the first area filled with the gas to be examined.

7. The apparatus as claimed in claim 5, wherein the first measurement cell is arranged in a first spatial direction as seen from the optical emitter and the second measurement cell is arranged in a second spatial direction, which is different than the first spatial direction, as seen from the optical emitter.

8. The apparatus as claimed in claim 5, wherein the first gas and the second gas have a same chemical composition.

9. The apparatus as claimed in claim 5, wherein a concentration of the first gas in the first measurement cell is lower than a concentration of the second gas in the second measurement cell.

10. The apparatus as claimed in claim 5, further comprising:
- a third hermetically sealed measurement cell filled with a third gas, the third gas being configured to absorb the optical radiation at the one or more predetermined wavelengths;
- a second area, filled with the gas to be examined, that is arranged between the second measurement cell and the third measurement cell; and
- a third microphone arranged in the third measurement cell and configured to generate a third microphone signal on the basis of a photoacoustic excitation of the third gas by the optical radiation,
- wherein the evaluation circuit is further configured to take the third microphone signal and the second measurement signal as a basis for generating a third measurement signal indicating a distance between the second measurement cell and the third measurement cell.

11. The apparatus as claimed in claim 10, wherein the evaluation circuit is further configured to take the second microphone signal and the third measurement signal as a basis for generating a fourth measurement signal indicating a concentration of the gas to be examined in the second area.

12. The apparatus as claimed in claim 10, wherein the first gas and the third gas have a same chemical composition.

13. The apparatus as claimed in claim 1, wherein the first microphone signal is representative of an absorption by only the first gas such that it is directly correlated to the absorption by the first gas.

14. An apparatus, comprising:
- a first optical emitter configured to emit first optical radiation at a first time;
- a second optical emitter configured to emit second optical radiation at a second time;
- at least two hermetically sealed measurement cells arranged in series between the first and the second optical emitters and each filled with a gas configured to absorb the first optical radiation and the second optical radiation at one or more predetermined wavelengths in each case, each of the at least two hermetically sealed measurement cells having a respective microphone arranged therein that is configured to generate a respective microphone signal of a plurality of microphone signals on the basis of a photoacoustic excitation of the gas in the respective measurement cell by the first optical radiation or the second optical radiation;
- at least one area, filled with a gas to be examined, that is arranged between the at least two hermetically sealed measurement cells; and
- an evaluation circuit configured to determine an emission intensity of the first optical emitter at the one or more predetermined wavelengths based on a change in a first microphone signal of the plurality of microphone signals after the first time and to determine an emission intensity of the second optical emitter at the one or more predetermined wavelengths based on a change in a second microphone signal of the plurality of microphone signals after the second time.

15. The apparatus as claimed in claim 14, wherein the evaluation circuit is further configured to determine a concentration of the gas to be examined in the at least one area based on changes in the plurality of microphone signals after the first time and changes in the plurality of microphone signals after the second time.

16. The apparatus as claimed in claim 14, wherein:
- the at least two hermetically sealed measurement cells includes three hermetically sealed measurement cells arranged in series between the first and the second optical emitters,
- the at least one area includes two areas filled with the gas to be examined that are arranged between different pairs of the three hermetically sealed measurement cells, and
- the evaluation circuit is further configured to determine at least one interval between successive measurement cells of the three hermetically sealed measurement cells based on changes in the plurality of microphone signals after the first time and changes in the plurality of microphone signals after the second time.

17. A method, comprising:
emitting optical radiation by means of an optical emitter;
absorbing the optical radiation at one or more predetermined wavelengths by a first gas in a first hermetically sealed measurement cell;
generating a first microphone signal on a basis of a photoacoustic excitation of the first gas by the optical radiation by a first microphone arranged in the first hermetically sealed measurement cell; and
generating a first measurement signal, indicating an emission intensity of the optical emitter at the one or more predetermined wavelengths, based on the first microphone signal.

18. The method as claimed in claim 17, further comprising:
absorbing the optical radiation at the one or more predetermined wavelengths by a second gas in a second hermetically sealed measurement cell, a first area filled with a gas to be examined being arranged between the optical emitter and the second hermetically sealed measurement cell;

generating a second microphone signal on a basis of a photoacoustic excitation of the second gas by the optical radiation by a second microphone arranged in the second measurement cell; and generating a second measurement signal, indicating a concentration of the gas to be examined in the first area, based on the second microphone signal and the first microphone signal.

19. The method as claimed in claim 18, further comprising:

absorbing the optical radiation at the one or more predetermined wavelengths by a third gas in a third hermetically sealed measurement cell, a second area filled with the gas to be examined being arranged between the second hermetically sealed measurement cell and the third hermetically sealed measurement cell;

generating a third microphone signal on a basis of a photoacoustic excitation of the third gas by the optical radiation by a third microphone arranged in the third measurement cell; and generating a third measurement signal, indicating a distance between the second hermetically sealed measurement cell and the third hermetically sealed measurement cell, based on the third microphone signal and the second measurement signal.

20. The method as claimed in claim 19, further comprising:

generating a fourth measurement signal, indicating a concentration of the gas to be examined in the second area, based on the second microphone signal and the third measurement signal.

21. A method, comprising:

emitting first optical radiation at a first time by a first optical emitter;

emitting second optical radiation at a second time by a second optical emitter;

absorbing the first optical radiation and the second optical radiation at one or more predetermined wavelengths by a gas in at least two hermetically sealed measurement cells, the at least two hermetically sealed measurement cells being arranged in series between the first and the second optical emitters, and at least one area filled with a gas to be examined being arranged between the at least two hermetically sealed measurement cells;

generating, for each of the at least two hermetically sealed measurement cells, a respective microphone signal on a basis of a photoacoustic excitation of the gas in a respective measurement cell of the at least two hermetically sealed measurement cells by the first optical radiation or the second optical radiation by a microphone arranged in the respective measurement cell;

determining an emission intensity of the first optical emitter at the one or more predetermined wavelengths based on a change in a first microphone signal after the first time, the first microphone signal being the respective microphone signal derived from a first one of the at least two hermetically sealed measurement cells; and determining an emission intensity of the second optical emitter at the one or more predetermined wavelengths based on a change in a second microphone signal after the second time, the second microphone signal being the respective microphone signal derived from a second one of the at least two hermetically sealed measurement cells.

* * * * *